United States Patent
Litwin et al.

(10) Patent No.: US 7,537,750 B2
(45) Date of Patent: May 26, 2009

(54) METHOD FOR PRODUCING HYDROGEN GAS BY STEAM METHANE REFORMING USING SOLAR ENERGY

(75) Inventors: Robert Zachary Litwin, Canoga Park, CA (US); Albert E. Stewart, Sylmar, CA (US)

(73) Assignee: United Technologies Corporation, Hartford, CT (US)

( * ) Notice: Subject to any disclaimer, the term of this patent is extended or adjusted under 35 U.S.C. 154(b) by 845 days.

(21) Appl. No.: 10/891,314

(22) Filed: Jul. 14, 2004

(65) Prior Publication Data

US 2006/0013765 A1   Jan. 19, 2006

(51) Int. Cl.
*C01B 3/22* (2006.01)
*C01B 3/24* (2006.01)

(52) U.S. Cl. .................. 423/648.1; 423/650; 423/651; 423/652

(58) Field of Classification Search ............ 423/648.1, 423/650, 651, 652
See application file for complete search history.

(56) References Cited

U.S. PATENT DOCUMENTS

| 1,934,836 A | 11/1933 | Wietzel et al. |
| 1,959,151 A | 5/1934 | Beekley |
| 4,098,587 A | 7/1978 | Krar et al. |
| 4,391,793 A * | 7/1983 | Boese ........................ 204/155 |
| 4,552,741 A * | 11/1985 | Melchior ..................... 423/359 |
| 4,668,494 A | 5/1987 | Van Hook |
| 4,696,809 A * | 9/1987 | Vialaron et al. ............. 423/579 |
| 5,881,549 A | 3/1999 | Janes |
| 6,093,306 A | 7/2000 | Hanrahan et al. |
| 6,767,530 B2 * | 7/2004 | Kobayashi et al. .......... 423/650 |
| 6,872,378 B2 * | 3/2005 | Weimer et al. .............. 423/650 |
| 6,875,417 B1 * | 4/2005 | Shah et al. .................. 423/650 |
| 7,033,570 B2 * | 4/2006 | Weimer et al. .............. 423/650 |
| 2005/0226809 A1 * | 10/2005 | Gudlavalleti et al. ........ 423/651 |

FOREIGN PATENT DOCUMENTS

DE   3933285   * 4/1991   ................. 423/650

* cited by examiner

*Primary Examiner*—Wayne Langel
(74) *Attorney, Agent, or Firm*—Carlson, Gaskey & Olds PC

(57) ABSTRACT

Hydrogen gas is produced by reacting a carbon-hydrogen-containing species with water provided as a water reforming inflow at a reforming temperature to produce a primary reacted gas flow containing hydrogen gas. The carbon-hydrogen-containing species and water are heated to the reforming temperature with solar energy. The heating is preferably performed by heating a molten metal to at least the reforming temperature with solar energy, and using the molten metal to heat the carbon-hydrogen-containing species and water to at least the reforming temperature. The water reforming inflow is preheated by heat exchange from the primary reacted gas flow. The primary reacted gas flow is reacted with water to produce additional hydrogen gas in a secondary reacted gas flow.

19 Claims, 2 Drawing Sheets

METHOD FOR PRODUCING HYDROGEN GAS BY STEAM METHANE REFORMING USING SOLAR ENERGY

This invention relates to the production of hydrogen and, more particularly, to a solar-heated hydrogen-production approach.

BACKGROUND OF THE INVENTION

Hydrogen is a clean-reacting, energy-dense fuel that has the potential for widespread, nonpolluting use in a hydrogen-based economy. For example, hydrogen could be reacted in a fuel cell to power vehicles or provide space heating, without generating any carbon-based pollutants. Hydrogen may be burned in a gas turbine to provide electricity on a grid. Hydrogen is also widely used in industrial processing.

There are a number of approaches to producing hydrogen. Examples include steam methane reforming, electrolysis, partial oxidation, and dissociation reactions. Steam methane reforming is used in many instances because its inputs are methane, which is readily available in natural gas, and water. The methane and water are reacted at elevated temperature to produce hydrogen gas. The steam methane reaction is highly endothermic, so that substantial amounts of energy must be supplied to the chemical reaction. This energy is normally supplied by burning a portion of the available methane. This burning to produce heat consumes a substantial portion of the available methane and potentially produces pollutants. Other techniques also utilize the burning of a hydrocarbon fossil fuel with similar results.

There is a need for an improved approach to the production of hydrogen gas from hydrocarbon sources. Such an improved approach would desirably avoid the consumption of fossil fuels for heating, while achieving a high thermodynamic and chemical efficiency of hydrogen production from the available resources. The present invention fulfills this need, and further provides related advantages.

SUMMARY OF THE INVENTION

The present invention provides a method of producing hydrogen gas suitable for subsequent uses in providing energy, as a chemical feedstock, and the like. The hydrogen gas is produced from the reaction of water and reformable hydrocarbons such as methane, ethanol, or methanol. The hydrocarbon may be supplied from any operable source, such as by biomass techniques, or from fossil-fuel sources such as natural gas. The present approach is highly efficient, both in terms of energy usage and in terms of the amount of hydrogen gas produced in relation to the amount of the hydrocarbon that is consumed.

In accordance with the invention, a method for producing hydrogen gas comprises the steps of reacting a carbon-hydrogen-containing species with water provided as a water reforming inflow at a reforming temperature to produce a primary reacted gas flow containing hydrogen gas. The reforming is typically performed in the presence of a catalyst. The reforming temperature is preferably at least about 1500° F., more preferably about 1600° F. The carbon-hydrogen-containing species and water are heated to the reforming temperature with solar energy. The water reforming inflow is preheated by heat exchange from the primary reacted gas flow. The primary reacted gas flow is further reacted with water to produce additional hydrogen gas in a secondary reacted gas flow, thereby improving the overall efficiency of hydrogen production. Preferably, the steps of heating and preheating do not involve any burning of a hydrocarbon (fossil) fuel.

The carbon-hydrogen-containing species may be conveniently provided as methane, such as the methane occurring in natural gas. The carbon-hydrogen-containing species may instead be provided from other sources. In one instance, the carbon-hydrogen-containing species is an alcohol such as ethanol or methanol. These reactants may be produced by a biomass reaction.

The solar heating of the reforming reaction is preferably performed by heating a heat-transfer fluid, preferably a liquid metal, to at least the reforming temperature with solar energy, and using the heat-transfer fluid to heat the carbon-hydrogen-containing species and water to at least the reforming temperature. The solar heating of the reforming reactants may be direct heating, but the temperature is more difficult to control. The burning of hydrocarbon fossil fuel is sometimes considered to be a solar process, because the plants that grew and eventually produced the fossil fuel received energy from the sun. However, the use of "solar energy" in the present approach is limited to methods in which the solar energy is used directly without an intermediate step of producing a fossil fuel. A fossil fuel is typically used as one of the reactants in the reforming process, but without the direct concentrated use of solar energy provided to heat the reforming reaction.

The present approach has a high chemical efficiency in the production of hydrogen gas, four moles of hydrogen gas per mole of methane. The process is also thermally efficient in that the considerable amount of heat required to drive the endothermic reforming reaction is provided by the sun, without the need to burn methane or other fossil fuel. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
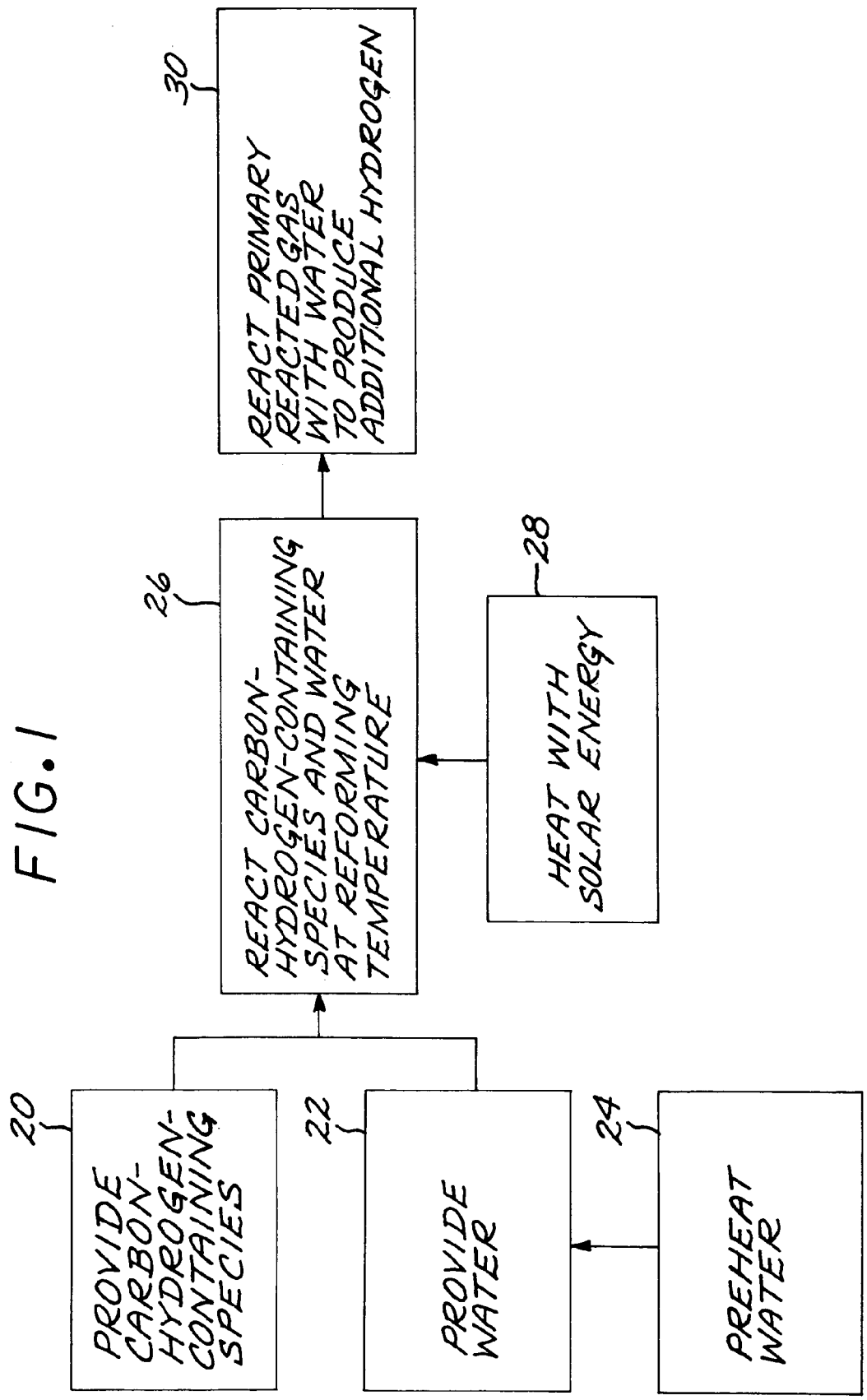
FIG. 1 is a block diagram of a preferred approach for practicing an embodiment of the present approach.
Figure 2:
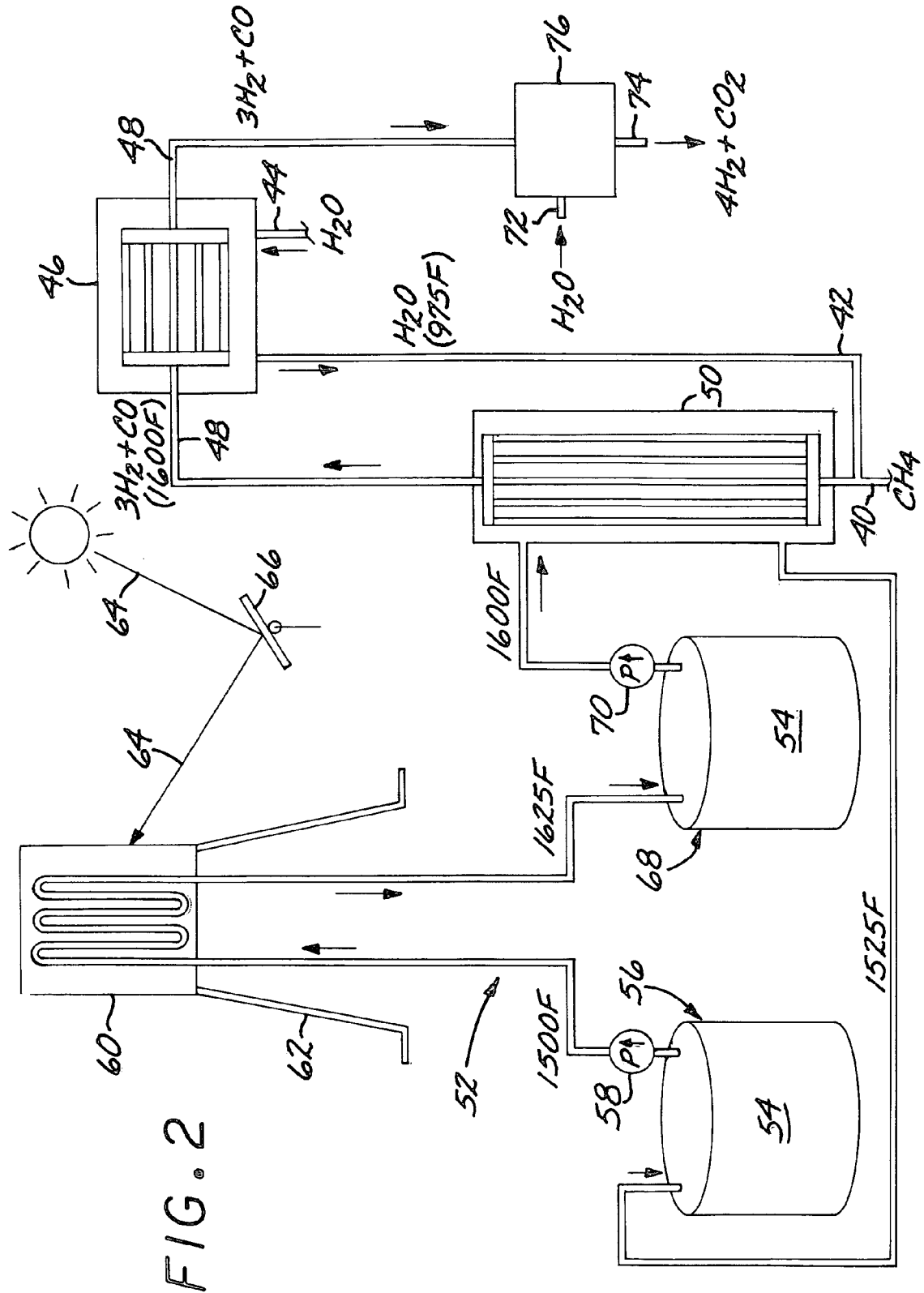
FIG. 2 is a schematic illustration of a plant operation for practicing the method of FIG. 1.

FIG. 1 depicts a process for producing hydrogen gas, and FIG. 2 illustrates a plant operation that may be used to implement this process. FIG. 2 identifies operable and preferred temperatures, but the present approach is not limited to these identified temperatures. A carbon-hydrogen-containing species is provided, step 20 of FIG. 1 and carbon-hydrogen-containing species inflow 40 of FIG. 2. The carbon-hydrogen-containing species may be any species that may be reformed to produce hydrogen gas. Examples include methane, ethanol, and methanol. Methane is widely available in natural gas, and step 20 may be performed by separating the methane from natural gas. Ethanol and methanol are alcohols that are produced by biomass reactions, and step 20 may be performed by a biomass reaction. The plant operation is illustrated in FIG. 2 for the use of methane, which is the presently most preferred carbon-hydrogen-containing species inflow 40, but it is not so limited.

Water is provided, step 22 of FIG. 1 and water-reforming inflow 42 of FIG. 2. The water-reforming inflow 42 is preferably preheated, step 24 of FIG. 1, to a temperature of about 975° F. so that the water is in the form of steam. The preheating 24 is preferably accomplished by passing a water inlet flow 44 through a water preheat heat exchanger 46.

The carbon-hydrogen-containing species of the carbon-hydrogen-containing species inflow 40 is chemically reacted, step 26 of FIG. 1, with the water of the water reforming inflow 42 at a reforming temperature. This reforming reaction is preferably performed in the presence of a catalyst such as platinum, in a reforming reactor 50. The reforming temperature most preferably is 1600° F. This reforming reaction 26 produces a primary reacted gas flow 48 containing hydrogen gas by the reforming chemical reaction $$CH_4+H_2O=3H_2+CO.$$

The reforming chemical reaction is performed at the reforming temperature, and is highly endothermic. To provide the necessary heat input, the carbon-hydrogen-containing species and the water are heated to the reforming temperature with solar energy, step 28 of FIG. 1. The solar energy may be provided by any approach wherein the thermal energy of the sun is used to heat the reactants of the reforming reaction. FIG. 2 depicts a preferred solar-energy heating loop 52. A heat-transfer fluid 54 is stored in a first holding tank 56, preferably at a temperature of about 1525° F. The heat-transfer fluid 54 may be of any operable type, but is preferably a liquid metal such as liquid sodium or a liquid mixture of sodium or sodium-potassium.

The heat-transfer fluid 54 is pumped by a first pump 58 to a solar heat exchanger 60, which typically is placed at the top of a tower 62. Solar rays 64 are directed toward and concentrated at the solar heat exchanger 60 by a field of one or more heliostats 66. The heat-transfer fluid 54 is heated in the solar heat exchanger 60, preferably to a temperature of about 1625° F. The heated heat-transfer fluid 54 is held in an insulated second holding tank 68, where it typically cools slightly to about 1600° F. The heat-transfer fluid 54 is pumped to the reforming reactor 50 by a second pump 70.

The reforming reactor 50 serves two purposes. First, it contains the reforming reaction. Second, it serves as a heat exchanger to transfer heat from the heat-transfer fluid 54 into the reactants of the reforming reaction, as the heat-transfer fluid 54 flows through internal pipes that extend along the length of the elongated reforming reactor 50. The heat-transfer fluid 54 preferably flows countercurrently to the flow of the reforming reaction reactants, the carbon-hydrogen-containing species and the water. The heat-transfer fluid 54, cooled to about 1525° F. in the preferred approach by its heating of the reactants of the reforming reaction, then flows back to the first holding tank 56.

The reaction products of the reforming reaction, the primary reacted gas flow 48, flows to the water preheat heat exchanger 46, to provide the thermal energy for the preheating of the water-reforming inflow 42 in the preheating step 24.

The primary reacted gas flow 48 contains 3 moles of hydrogen gas ($H_2$) and one mole of carbon monoxide (CO), for each mole of methane introduced as the carbon-hydrogen-containing species inflow 40. The yield of hydrogen gas may be increased by reacting the primary reacted gas flow 48 with a secondary water flow 72 to produce additional hydrogen gas in a secondary reacted gas flow 74, step 30. This reaction may be conveniently performed in a shift reactor 76 according to the shift reaction $$CO+H_2O=H_2+CO_2.$$

The net result of the reforming reaction and the shift reaction is given by the relation $$CH_4+2H_2O=4H_2+CO_2.$$

The result is four moles of hydrogen gas produced for each mole of methane introduced.

This output of hydrogen gas is achieved using only solar heating, and preferably wherein the steps of heating 28 and preheating 24 do not involve any burning of a hydrocarbon fuel. Accordingly, the process is environmentally friendly. If the source of the carbon-hydrogen-containing species is a biomass reaction, then the entire process uses only renewable resources.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for producing hydrogen gas, comprising the steps of:

reacting a carbon-hydrogen-containing species with water provided as a water reforming inflow at a reforming temperature to produce a primary reacted gas flow containing hydrogen gas;

heating the carbon-hydrogen-containing species and water to the reforming temperature with solar energy, wherein the heating includes heating a molten metal to at least the reforming temperature with solar energy, and using the heated molten metal to heat the carbon-hydrogen-containing species and water to at least the reforming temperature;

preheating the water reforming inflow by heat exchange from the primary reacted gas flow; and reacting the primary reacted gas flow with water to produce additional hydrogen gas in a secondary reacted gas flow.

2. The method of claim 1, wherein the step of reacting the carbon-hydrogen-containing species with water includes the step of reacting the carbon-hydrogen-containing species with water in the presence of a catalyst.

3. The method of claim 1, wherein the step of reacting the carbon-hydrogen-containing species with water includes the step of providing the carbon-hydrogen-containing species comprising methane.

4. The method of claim 1, wherein the step of reacting the carbon-hydrogen-containing species with water includes the step of providing the carbon-hydrogen-containing species comprising an alcohol selected from the group consisting of ethanol and methanol.

5. The method of claim 1, including an additional step of producing the carbon-hydrogen-containing species by a biomass reaction.

6. The method of claim 1, wherein the steps of heating and preheating do not involve any burning of a hydrocarbon fuel.

7. The method claim 1, wherein the step of heating the carbon-hydrogen-containing species includes directing solar rays with at least one heliostat toward a solar heat exchanger.

8. The method of claim 1, including circulating the molten metal between an insulated holding tank and a reforming reactor for reacting the carbon-hydrogen-containing species, to heat the carbon-hydrogen-containing species.

9. The method of claim 1, including circulating the molten metal between a first holding tank at a first temperature, a second holding tank at a second temperature that is greater than the first temperature, and a reforming reactor for reacting the carbon-hydrogen-containing species, to heat the carbon-hydrogen-containing species.

10. The method of claim 1, including establishing a counter-current flow between the heated molten metal and the carbon-hydrogen-containing species through a reforming reactor for reacting the carbon-hydrogen-containing species, to heat the carbon-hydrogen-containing species.

11. A method for producing hydrogen gas, comprising the steps of:
reacting a carbon-hydrogen-containing species with water provided as a water reforming inflow at a reforming temperature of at least 1500.degree. F. and in the presence of a catalyst to produce a primary reacted gas flow containing hydrogen gas;
heating the carbon-hydrogen-containing species and water to the reforming temperature with solar energy, wherein the step of heating includes the steps of
heating a molten metal to at least the reforming temperature with solar energy, and
using the molten metal to heat the carbon-hydrogen-containing species and water to at least the reforming temperature;
preheating the water reforming inflow by heat exchange from the primary reacted gas flow; and
reacting the primary reacted gas flow with water to produce additional hydrogen gas in a secondary reacted gas flow.

12. The method of claim 11, wherein the step of reacting the carbon-hydrogen-containing species with water includes the step of
providing the carbon-hydrogen-containing species comprising methane.

13. The method of claim 11, wherein the step of reacting the carbon-hydrogen-containing species with water includes the step of
providing the carbon-hydrogen-containing species comprising an alcohol selected from the group consisting of ethanol and methanol.

14. The method of claim 11, including an additional step of producing the carbon-hydrogen-containing species by a biomass reaction.

15. The method of claim 11, wherein the steps of heating and preheating do not involve any burning of a hydrocarbon fuel.

16. A method for producing hydrogen gas, comprising the steps of:
reacting a carbon-hydrogen-containing species with water provided as a water reforming inflow at a reforming temperature of at least about 1500.degree. F. in the presence of a catalyst in a reforming apparatus to produce a primary reacted gas flow containing hydrogen gas;
heating the carbon-hydrogen-containing species and water to the reforming temperature with solar energy, wherein the step of heating includes the steps of
heating a molten metal to at least the reforming temperature with solar energy, and
using the molten metal to heat the carbon-hydrogen-containing species and water to at least the reforming temperature;
preheating the water reforming inflow by heat exchange from the primary reacted gas flow in a preheat heat exchange; and
reacting the primary reacted gas flow with water in a shift reactor to produce additional hydrogen gas in a secondary reacted gas flow.

17. The method of claim 16, wherein the step of reacting the carbon-hydrogen-containing species with water includes the step of
providing the carbon-hydrogen-containing species comprising methane.

18. The method of claim 16, wherein the step of reacting the carbon-hydrogen-containing species with water includes the step of
providing the carbon-hydrogen-containing species comprising an alcohol selected from the group consisting of ethanol and methanol.

19. The method of claim 16, including an additional step of producing the carbon-hydrogen-containing species by a biomass reaction.

* * * * *